United States Patent [19]
Pohlman

[11] Patent Number: 6,095,477
[45] Date of Patent: Aug. 1, 2000

[54] WORK-ORDER CLIP BOARD

[76] Inventor: Jeff Pohlman, 1400 Scottsboro, Richardson, Tex. 75082

[21] Appl. No.: 09/251,112

[22] Filed: Feb. 16, 1999

Related U.S. Application Data

[60] Provisional application No. 60/074,952, Feb. 17, 1998.

[51] Int. Cl.[7] ...................................................... B60J 10/00
[52] U.S. Cl. ........................... 248/452; 248/95; 224/482; 224/277; 224/560; 224/566
[58] Field of Search ................................. 248/452, 451, 248/447.1, 95, 311.2, 441.1; 228/482, 277, 556, 560, 566; D12/414; 206/335; 281/45

[56] References Cited

U.S. PATENT DOCUMENTS

| | | | |
|---|---|---|---|
| 2,650,784 | 9/1953 | Thayer et al. | 248/95 |
| 3,138,361 | 6/1964 | Meldrum | 248/95 |
| 4,154,383 | 5/1979 | Honatzis | 224/556 |
| 4,946,065 | 8/1990 | Goulter et al. | 248/95 |
| 5,031,808 | 7/1991 | Dolenc | 248/95 |
| 5,116,012 | 5/1992 | Offenhauer et al. | 248/452 |
| 5,152,490 | 10/1992 | Deutsch | 248/452 |
| 5,180,133 | 1/1993 | Chang | 248/452 |
| 5,312,082 | 5/1994 | Chang | 248/452 |
| 5,413,382 | 5/1995 | Cornell et al. | 281/45 |
| 5,732,925 | 3/1998 | Shamoon | 248/452 |

*Primary Examiner*—Ramon O. Ramirez
*Assistant Examiner*—Jon A Szumny
*Attorney, Agent, or Firm*—Felsman, Bradley, Vaden, Gunter & Dillon; Charles D. Gunter, Jr.

[57] ABSTRACT

A work-order clipboard is shown which can be suspended or mounted on the door window of a vehicle such as an automobile door window. The clipboard has a writing surface and an oppositely arranged, weather resistant pouch. Once mounted on a vehicle window, the writing surface of the clipboard is located within the vehicle interior and thus protected from the elements. The oppositely arranged pouch is positioned on the exterior of the vehicle window and can be used to store car keys or other objects in a convenient fashion.

8 Claims, 2 Drawing Sheets

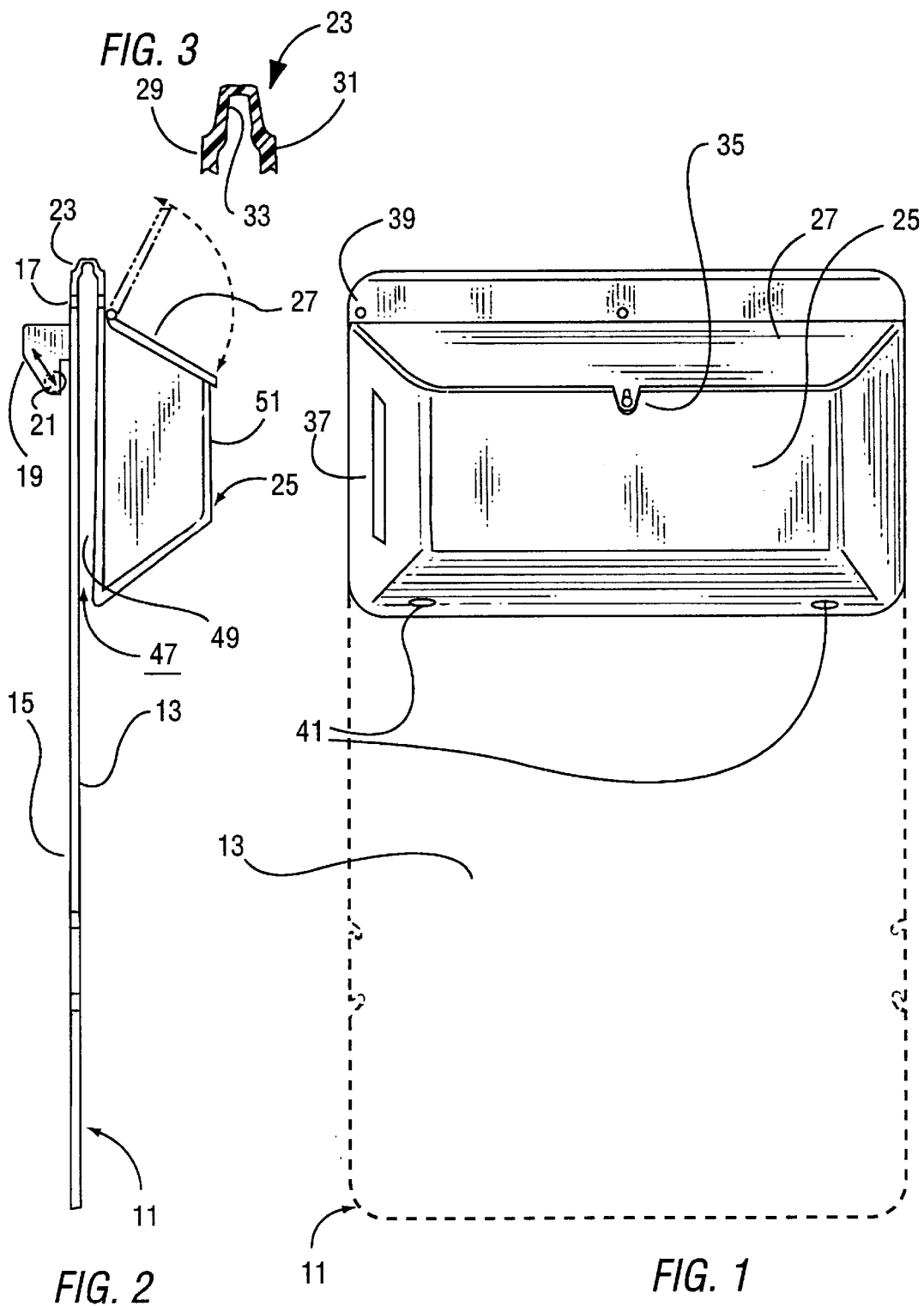

WORK-ORDER CLIP BOARD

CROSS-REFERENCE TO RELATED APPLICATION

Benefit is herein claimed of the filing date under 35 U.S.C. §§ 119 and/or 120, and 37 CFR § 1.78 to U.S. provisional patent application Ser. No. 60/074,952, filed on Feb. 17, 1998, Entitled "Hot Spot."

BACKGROUND OF THE INVENTION

1. Field of the Invention

The present invention relates to a writing pallet that can be attached to a vehicle window. More specifically, the invention relates to a clipboard for work orders that has an attached pouch on the backside for placing items to be protected from the weather, while the writing surface of the clipboard is suspended from the inside of a window of a vehicle.

2. Description of the Prior Art

Writing palettes and clipboards with various means of attaching paper to a writing surface are old in the art. While there are clipboard devices that have compartments for placing objects such as artwork pencils, etc., there are no clipboard devices that allow storage of items in opposition to the writing face, while still allowing the clipboard to be hung on a flat wall or surface.

A device that could be used to protect objects from the weather would be particularly useful in situations where the user needs a writing surface coupled to a means for attaching the clipboard to a vehicle. Such a device would be of particular use in service industries such as the oil-change, automotive repair, and other automotive industries. Since the outside of the vehicle is exposed to the elements, e.g. rain, there is also a need for having a means for attaching other items such as the keys to the vehicle on the same clip board. The means would keep the keys on the outside of the vehicle, while the writing surface would be on the inside. The present invention is directed toward this end.

SUMMARY OF THE INVENTION

It is thus one object of the present invention to provide a clipboard with writing surface and opposing storage pouch.

Another object of the present invention is to provide a clipboard for use in such situations where the driver of a vehicle or service personnel need to store such items as keys for convenience while performing other tasks.

Yet another object of the present invention is to provide a clipboard having an integral storage pouch coupled to the clipboard that is weather resistant.

It is yet another object of the present invention to provide a window support that can be used to attach a clipboard to a vehicle window.

It is yet another object of the present invention to provide a writing surface and opposing pouch that allows the writing surface to be placed flat against a planar support surface such as a vertical vehicle window surface.

The objects of the invention are carried out by having a clipboard with a writing surface on one side and opposing pouch for storing items on an opposite side. Once in place on a vehicle window, the writing surface faces the interior of the vehicle, while the pouch faces the exterior of the vehicle to protect the items inside from the weather. This is accomplished by having a window support forming a support channel. The support channel makes contact with the upper edge of a vehicle window.

The window support has inner and outer suspension edges. The inner suspension edge is coupled to a planar member having a writing surface and a bottom surface. The outer suspension edge is coupled to a pouch. The planar member and a back face of the pouch form a space in which a vehicle window will fit, the upper edge of the window ultimately making contact with the support channel of the window support.

The pouch can take many forms. The most important feature of the pouch is that it is weather resistant so that items kept inside are either kept dry or a means is provided to prevent water from accumulating.

Additional objects, features and advantages will be apparent in the written description which follows.

BRIEF DESCRIPTION OF THE DRAWINGS

FIG. 1 is a view of the outer surface of the planar member and the pouch of the invention;

FIG. 2 is a side view of the device of the invention;

FIG. 3 is a close-up isolated view of the side of the support channel of the device of the invention.

DETAILED DESCRIPTION OF THE INVENTION

Figure 4:
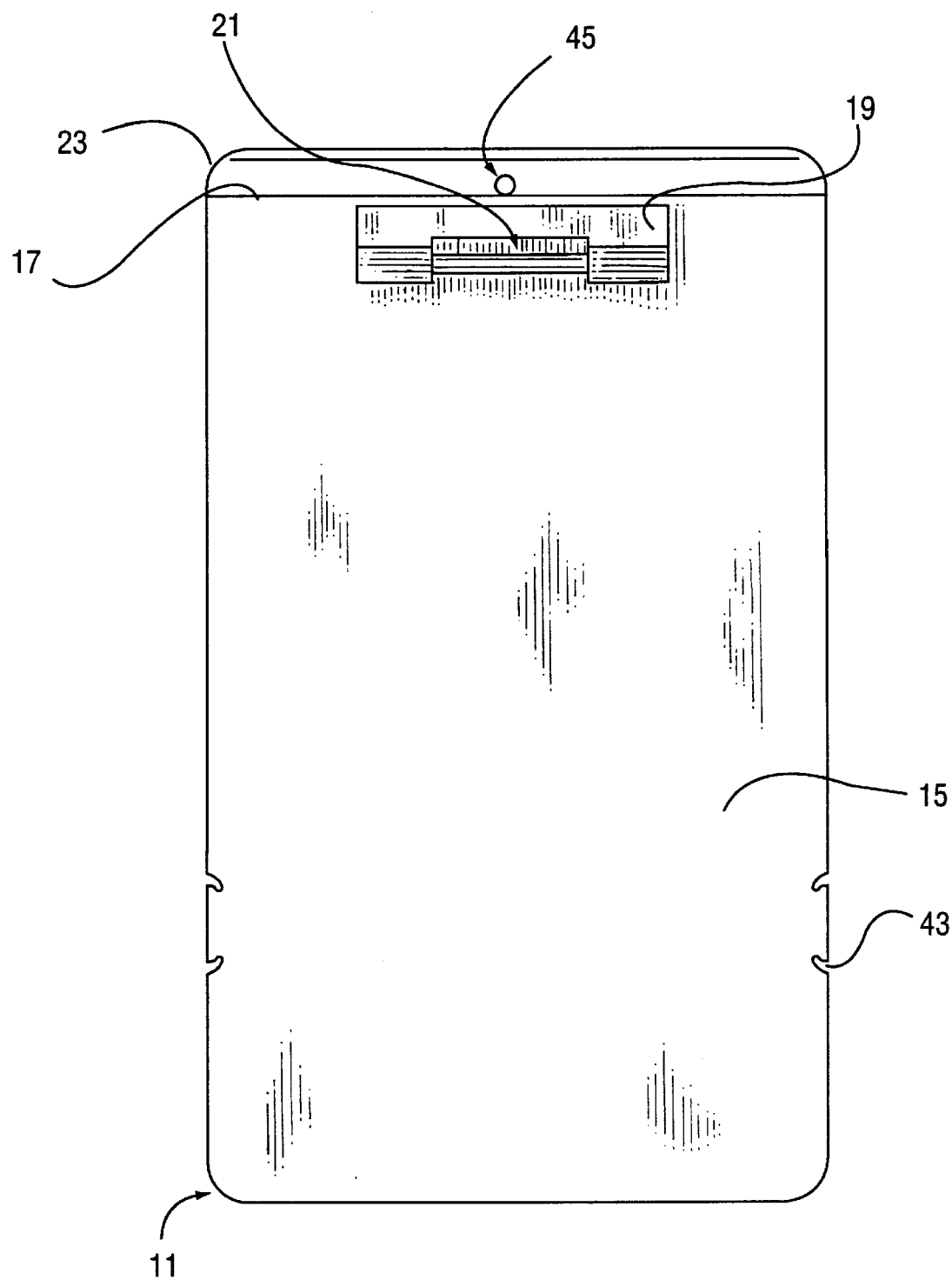
FIG. 4 is a view of the inner writing surface of the device of the invention.

The present invention is a clipboard to hold a work order or other paper document securely to one side, and items such as vehicle keys on the other side, in a weather resistant pouch. One embodiment of the clipboard of the invention is shown from three perspectives in FIG. 1, FIG. 2, and FIG. 4. The planar member 11 of the invention has an outer surface 13 and an inner writing surface 15. The planar member 11 has a top edge 17 that is attached to window support 23 described in greater detail below.

Planar member 11 can be constructed of, for instance, ⅛ inch thick rigid clear acrylic plastic and other related plastic materials. The finished product, using plastics, will weigh between 10 and 12 ounces. Aluminum or other light gage metals can also be used as an alternate material in construction. The planar member would generally have overall dimensions of 9 inches width by 14 inches length, although other dimensions would also be useful.

Located on the inner writing surface 15 is a tensional contact member 19 with tensional roller 21. It is to be understood by those skilled in the art that other means of securing paper to the writing surface can be used in the present invention such as a spring-loaded tensional clip. The tensional contact member 19 and roller 21 are used to secure and suspend a piece or pieces of paper onto the writing surface 15. The tabs 43 help hold the paper against the writing surface.

Window support 23 couples the planar member 11 and the pouch 25. The support channel is shown in detail in FIG. 3. The support channel has a inner suspension edge 29 and an outer suspension edge 31. The inner and outer suspension edges 29, 31 are spaced apart to form a support channel 33. The width of the support channel 33 is approximately that of the thickness of an average vehicle window. The top edge 17 of the planar member is coupled to the inner suspension edge 29 of the window support.

Coupled to the outer suspension edge 31 of the window support 23 is the pouch 25. In the embodiment shown in FIG. 1 and FIG. 2, the pouch has a hinged lid 27 that can be secured with clip 35. It is to be understood that the pouch can take a number of forms and be made of a number of materials. The major criteria is that the pouch be resistant to weather conditions such as rain and cold. Items stored in the pouch should either be kept dry, or a means such as holes 41 should be provided to allow water to escape. The pouch should be large enough to hold a typical set of keys on a keychain. For instance, in the present embodiment the pouch is 9 inches by 4 inches at the back face 49, and 7 inches by 2 inches at the front face 51.

The invention works by being placed on the upper edge of a vehicle window, the writing face and pouch being arranged to face in opposing directions on the window. To install the device, the window of the vehicle would be lowered enough to allow the planar member and tensional contact member to pass through the window opening. As the planar member is passed through the open window, the upper edge of the window is passed through the space 47 formed by the pouch and planar member. The clipboard is placed far enough onto the window so that contact is made between the upper edge of the window and the support channel 33 formed within the window support 23. The vehicle window can then be closed with the clipboard attached.

There can be other features provided to the clipboard to impart greater convenience. For instance, can be a hole(s) 39 and/or 45 in the planar member for hanging the clipboard on a vertical surface such as a wall. There can also be a pencil or pen holder coupled to the clipboard, in the present embodiment the holder 37 being coupled to the pouch 25.

One of the advantages of this invention is that the opposing pouch and writing surface geometry provide a clipboard that can be place firmly and flatly against another flat surface such as a vehicle window. This is an improvement over the prior art where a storage device might be attached to the front of the board.

A further advantage of the present invention is that the writing surface and pouch can be placed on a vehicle window such that paper on the clipboard will remain inside the vehicle, hence, dry and clean, while the pouch remains on the outside of the vehicle.

A further advantage of the present invention is that the pouch is weather resistant, thus allowing for the placement of items such as the keys to the vehicle for convenience to prevent locking the keys inside the vehicle.

While the invention has been shown in only one of its forms, it is not thus limited but is susceptible to various changes and modifications without departing from the spirit thereof.

What is claimed is:

1. A work-order clipboard mountable on a vehicle window having inside and outside window surfaces and a top window edge, the clipboard comprising:

a window support forming a support channel with an inner suspension edge and an outer suspension edge;

a planar member having an inner writing surface, an outer surface and a top edge, the top edge coupled to the inner suspension edge of the support channel;

a tensional contact member coupled to the writing surface for securing paper against the writing surface;

a pouch having a weather resistant interior for storing items, the pouch coupled to the outer suspension edge of the support channel such that when the support channel is placed on the vehicle top window edge, the pouch is suspended on the outside window surface.

2. The clipboard of claim 1, wherein the pouch is resistant to weather conditions such as water and cold.

3. The clipboard of claim 1, wherein -the writing surface of the planar member is adapted to be located on the interior the vehicle while suspended on the vehicle window, thus protected from the weather.

4. The clipboard of claim 1, wherein the pouch has a closure that prevents water from entering the interior.

5. The clipboard of claim 1, wherein the pouch has holes to prevent water accumulation.

6. The clipboard of claim 1, wherein the tensional contact member is a roller that holds paper against the writing surface of the planar member.

7. The clipboard of claim 1, wherein the tensional contact member is a spring-tensioned clamp.

8. The clipboard of claim 1, wherein the support channel of the window support is selectively sized for fitting conventional vehicle door window.

* * * * *